United States Patent [19]

Reinartz et al.

[11] 4,409,885

[45] Oct. 18, 1983

[54] BRAKE BOOSTER

[75] Inventors: Hans-Dieter Reinartz; Rudolf Thiel, both of Frankfurt am Main, Fed. Rep. of Germany

[73] Assignee: ITT Industries, Inc., New York, N.Y.

[21] Appl. No.: 253,433

[22] Filed: Apr. 13, 1981

[30] Foreign Application Priority Data

May 13, 1980 [DE] Fed. Rep. of Germany ....... 3018270

[51] Int. Cl.$^3$ ............................ F15B 9/10; F16J 15/18
[52] U.S. Cl. ............................... 91/376 R; 91/369 A; 92/98 D; 92/168
[58] Field of Search .................. 92/168, 369 A, 369 B, 92/369 R, 376 R; 74/18.2; 277/212 FB

[56] References Cited

U.S. PATENT DOCUMENTS 4,005,638 2/1977 Takeuchi ........................... 91/369 B

FOREIGN PATENT DOCUMENTS

| 1113375 | 3/1962 | Fed. Rep. of Germany . |
| 2125117 | 12/1972 | Fed. Rep. of Germany ....... 74/18.2 |
| 2757879 | 7/1978 | Fed. Rep. of Germany . |
| 2927484 | 1/1980 | Fed. Rep. of Germany . |
| 2434738 | 3/1980 | France . |

Primary Examiner—Paul E. Maslousky
Attorney, Agent, or Firm—John T. O'Halloran; Alfred C. Hill

[57] ABSTRACT

To provide a space inside the housing of a brake booster for installation of an end portion of a master brake cylinder, the hub member of the booster piston (movable wall) comprising an axial sleeve adapted to embrace an end portion of the master cylinder in the actuated position of the booster and a valve housing extending out of the booster casing opposite to the master cylinder and guided therein, the valve housing including internal longitudinal channels extending from its outer end to a chamber which surrounds the valve housing and leads to the working chamber of the brake booster.

19 Claims, 4 Drawing Figures

BRAKE BOOSTER

BACKGROUND OF THE INVENTION

The present invention relates to a brake booster, particularly for motor vehicles, including a booster casing, a movable wall disposed in the booster casing to divide the booster casing into a vacuum chamber and a working chamber, a control valve to control the pressure in the working chamber, the control valve casing being rigidly connected with the movable wall and arranged so as to be guided by the booster casing, at least one vacuum channel which connects the vacuum and the working chambers, and at least one outside air channel, the vacuum and air channels having a common channel section in the control valve which may be closed by the control valve.

Such a brake booster is disclosed in British Patent No. 1,546,853. In this brake booster, the movable wall forms an annular recess into which one of the end surfaces of the control casing is inserted. The control casing which may be either an all-metal or an all-plastic casing is connected with the movable wall by means of projecting bosses, which penetrate the movable wall in the manner of a snap fastener, or by means of bolts. The vacuum channel in this brake booster is passed through a conical head part to the valve and then, radially, through the wall of the casing outwards to the working chamber. This known brake booster features a relatively long constructional length. In addition, the hub of the control valve casing protrudes outwards, thus, having contact with unfiltered air which may lead to dirt accumulation.

SUMMARY OF THE INVENTION

Therefore, an object of the present invention is to construct a brake booster of the type referred to hereinabove so as to reduce the constructional length by simple means and to protect the guiding arrangement of the movable wall from getting contaminated.

A feature of the present invention is the provision of a brake booster comprising a booster casing having a movable wall disposed therein coaxial of a longitudinal axis of the booster casing to divide the booster casing into a vacuum chamber and a working chamber; and a control valve to control pressure in the working chamber, the control valve having a control valve casing rigidly connected to the movable wall, the valve casing having a guiding hub disposed coaxial of the axis to axially guide the valve casing in an axially outwardly extending portion of one transverse end wall of the booster casing defining the working chamber, the guiding hub having a common channel section extending from an end thereof remote from the movable wall toward the movable wall, the control valve having a chamber communicating with the common channel section disposed between the inner surface of the portion of one transverse end wall, an outer surface of the valve casing and a rolling diaphragm seal disposed between the portion of one transverse end wall and the valve casing, the rolling diaphragm having first longitudinal ribs forming channels.

The inventive solution provides a brake booster of small constructional length wherein the guiding hub is sealed from the outside, thus lying in the area of filtered air and, hence, contamination is prevented. The inventive brake booster needs only very few components of simple structure.

Copending U.S. patent application of J. Belart, Ser. No. 141,830, filed May 5, 1980, now U.S. Pat. No. 4,347,779, issued Sept. 7, 1982, assigned to the same assignee as the present application, discloses an annular chamber between an axial reinforcing tube and the control valve casing, the annular chamber being sealed by means of a rolling diaphragm at its end which faces the outside air, and an axial bore in the control valve casing for the communication of an annular chamber of the valve with the vacuum chamber via the inside space of the reinforcing tube and via slots provided therein. However, in the brake booster of the above copending application, by contrast to the brake booster of the present invention, the communication between the annular chamber of the valve and the working chamber is effected via a working chamber channel which essentially extends in the radial direction and via the annular chamber between the reinforcing tube and the control valve casing.

In one embodiment of the present invention, the guiding hub of the control valve casing is plastic and firmly connected with a metallic head part which, on its part, is connected with the movable wall. In this embodiment, the plastic component only extends in the area of the central or control piston guideway. Thus, on the one hand, less plastic is needed and, on the other hand, a better connection is provided.

In a further development of the inventive concept, the guiding hub of the control valve casing includes two sleeves nested in each other and forming therebetween the common channel section. This embodiment of the invention simplifies the manufacture of the control valve casing.

It is advantageous for the outer surface of the inner sleeve to have longitudinal ribs which extend primarily in the axial direction and form channels. Thus, a channel is formed between the sleeves in a simple way in terms of manufacturing technology.

The inner sleeve permits a particularly easy manufacture, similar to that of a multi-spline shaft. Such a one-piece plastic part does not cause any stability or moulding problems.

In a further embodiment of the present invention, the inner surface of the outer sleeve has longitudinal ribs forming channels. These longitudinal ribs formed as axial splines may be provided either instead of the longitudinal ribs provided on the outer surface of the inner sleeve or may be used in combination with the longitudinal ribs of the inner sleeve.

In a special embodiment of the present invention the head part of the control valve casing provides a shoulder on which the guiding hub of the control valve casing is seated. This embodiment of the invention enables an advantageous connection between the head part and the guiding hub.

In a further embodiment the head part has an annular groove engaged by a projection of the guiding hub. Thus, a particularly simple connection of the head part and the guiding hub is provided.

In still a further embodiment of the present invention, the head part has an additional shoulder through which the vacuum channel is passed, the vacuum channel subsequently being passed through the guiding hub which, with one end surface, rests at this further shoulder. Thus, with a simple and expedient connection of the head part and of the hub, an advantageous construction of the vacuum channel results.

According to a preferred embodiment of the present invention, the guiding hub is sealed outwards by means of a rolling diaphragm. Thus, the guiding hub lies in the working chamber wherein the air is filtered.

The rolling diaphragm expediently is sealingly fastened to the inner surface of the end of the guiding hub by means of its inner edge while it is sealingly fastened to the end of the cylindrical extension of the casing part by means of its outer edge. Thus, the entire guiding hub is protected against dirt accumulation.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
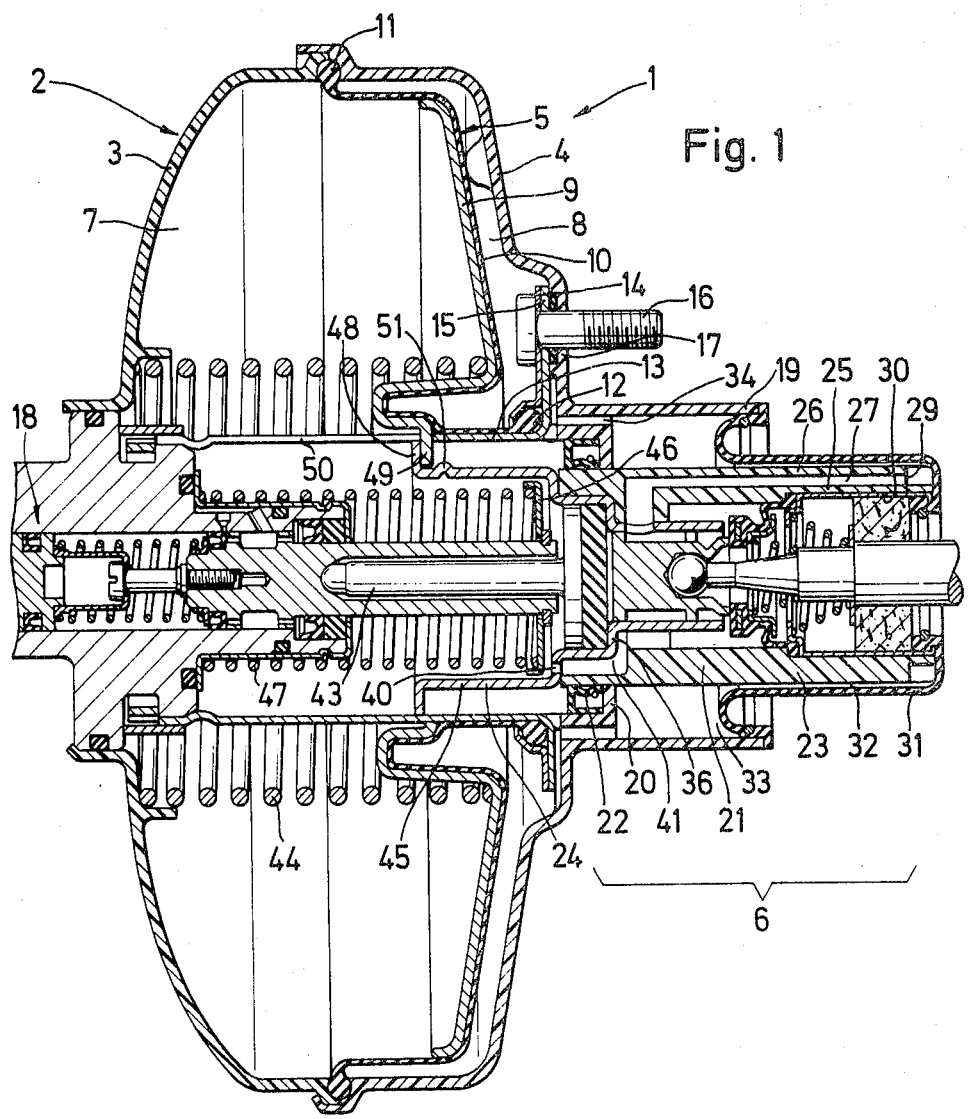
FIG. 1 is a longitudinal cross sectional view of a brake booster and an adjacent portion of a master brake cylinder in accordance with the principles of the present invention.

Referring to FIG. 1, brake booster 1 essentially includes a booster casing 2 formed by two cup-type casing parts 3 and 4, an axially movable wall 5 arranged therein and a control valve 6. Movable wall 5 divides booster casing 2 into a vacuum chamber 7 and a working chamber 8. Movable wall 5 includes a diaphragm plate 9 and a rolling diaphragm 10 abutting diaphragm plate 9. Rolling diaphragm 10 has sealing beads 11 and 12 at its outside and inside circumferences. Sealing bead 11 is sealingly clamped between casing parts 3 and 4. Sealing bead 12 is sealingly clamped at a central reinforcing tube 13 by means of a clamping plate 14.

Central reinforcing tube 13 has a flange part 15 which together with clamping plate 14 is fastened by means of threaded bolts 16 to the transverse end wall 17 of casing part 4 of booster casing 2 and, via the latter, to the splash wall (not shown) of a motor vehicle. By means of shearing, a master brake cylinder 18, only partially shown, is attached to the other end of reinforcing tube 13.

Casing part 4 has a cylindrical extension 19 in which control valve 6 is disposed in an axially displaceable manner. Cylindrical extension 19 has a radial surrounding projection 20 which points inwards and forms a guide for the control valve casing 21. Projection 20 accommodates a seal 22.

Figure 2:
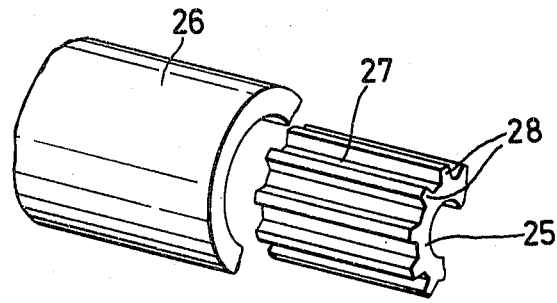
FIG. 2 is an exploded view of part of the guiding hub of FIG. 1 showing one embodiment thereof.
Figure 2A:
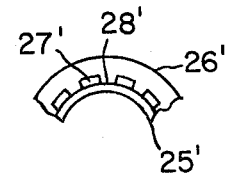
FIG. 2a is a partial end view of the guiding hub of FIG. 1 showing a second embodiment thereof.

For the purpose of guidance in projection 20, control valve casing 21 has a guiding hub 23 and a head part 24 firmly connected to guiding hub 23. Guiding hub 23 is made of plastic and, on its part, is made up of two parts. It has an inner sleeve 25 and an outer sleeve 26 which form therebetween at least one channel section 27. In guiding hub 23, illustrated in part in FIG. 2, inner sleeve 25 has longitudinal ribs 28 forming channel section 27 between one another. It is also possible to provide corresponding longitudinal ribs 28' at the inner surface of outer sleeve 26' to provide channel section 27' as shown in FIG. 2a which may be employed in place of ribs 28 or in cooperation with ribs 28 of FIG. 1. Channel section 27 essentially extends parallel to the longitudinal axis of control valve 6, ending at the end surface 29 of guiding hub 23. At end surface 29, a rolling diaphragm 31 is disposed at the inner surface 30 of guiding hub 23. The inner surface of rolling diaphragm 31 has longitudinal ribs 32 forming air channels between one another. In this way, a further channel section or a chamber 33 is provided which leads into working chamber 8 of booster casing 2 via a through opening 34 provided in casing part 4.

Figure 3:
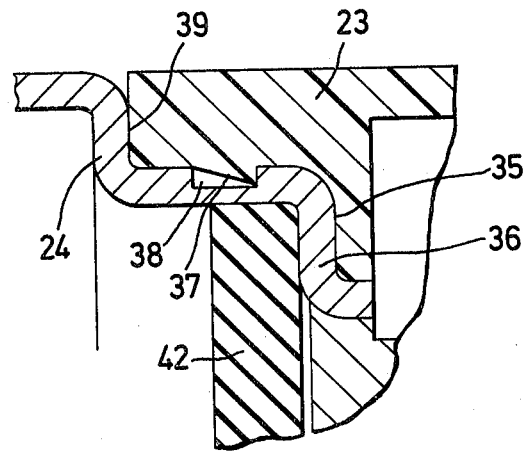
FIG. 3 is a partial cross sectional view of the connection of the guiding hub and the head part of the control valve casing of FIG. 1.

Head part 24 of control valve casing 21 connected with guiding hub 23 is made of metal and has a stepped construction. On the outer surface 35 of a first shoulder 36 adjacent guiding hub 23, guiding hub 23 (FIG. 3) is seated with a clamp-type section. For the purpose of connection of the two parts, guiding hub 23 has a projection 37 at its inner surface, projection 37 engaging a corresponding annular groove 38 provided on the outer surface of head part 24. In doing so, guiding hub 23 has an end surface resting against the radially extending surface of a second shoulder 39 of head part 24. A passage 40 is provided through shoulder 39, forming part of the vacuum channel. The latter continues in a subsequent channel section 41 of guiding hub 23.

The inner surface of first shoulder 36 of head part 24 remote from guiding hub 23 is abutted by a reaction disk 42 made of elastic rubber material. Via a push rod 43, reaction disk 42 transmits the boosting force generated by movable wall 5 because of the pressure difference between vacuum chamber 7 and working chamber 8 to an actuating piston (not shown) of master brake cylinder 18. A return spring 44 supporting itself at the transverse end wall of casing part 3 and at diaphragm plate 9 keeps movable wall 5 in a resilient manner in the illustrated initial position.

Head part 24 has an enlargement 45 receiving a supporting plate 46 and one end of compression spring 47. Head part 24 ends in a flange 48 which serves for the connection of control valve case 21 to diaphragm plate 9. To this end, diaphragm plate 9 has extensions 49 which extend through longitudinal slots 50 provided in reinforcing tube 13 and abut against flange 48. As illustrated, extensions 49 and head part 24 may be connected by pressing in a surrounding bead or several indentations 51.

While we have described above the principles of our invention in connection with specific apparatus, it is to be clearly understood that this description is made only by way of example and not as a limitation to the scope of out invention as set forth in the objects thereof and in the accompanying claims.

We claim:

1. A brake booster comprising:
a booster casing having a movable wall disposed therein coaxial of a longitudinal axis of said booster casing to divide said booster casing into a vacuum chamber and a working chamber; and
a control valve to control pressure in said working chamber, said control valve having a control valve casing rigidly connected to said movable wall, said valve casing having a guiding hub disposed coaxial of said axis to axially guide said valve casing in an axially outwardly extending portion of one transverse end wall of said booster casing defining said working chamber, said guiding hub having a common channel section extending from an end thereof remote from said movable wall toward said movable wall, said control valve having a chamber communicating with said common channel section disposed between an inner surface of said portion of one transverse end wall, an outer surface of said valve casing and a rolling diaphragm seal disposed between the inner surface of said portion of one transverse end wall and said valve casing, said rolling diaphragm having first longitudinal ribs therein cooperating with said outer surface of said valve casing to form channels to enable said chamber to communicate with said common channel section.

2. A brake booster comprising:
a booster casing having a movable wall disposed therein coaxial of a longitudinal axis of said booster casing to divide said booster casing into a vacuum chamber and a working chamber; and
a control valve to control pressure in said working chamber, said control valve having a control valve casing rigidly connected to said movable wall, said valve casing having a guiding hub disposed coaxial of said axis to axially guide said valve casing in an axially outwardly extending portion of one transverse end wall of said booster casing defining said working chamber, said guiding hub having a common channel section extending from an end thereof remote from said movable wall toward said movable wall, said control valve having a chamber communicating with said common channel section disposed between an inner surface of said portion of one transverse end wall, an outer surface of said valve casing and a rolling diaphragm seal disposed between said portion of one transverse end wall and said valve casing, said rolling diaphragm having first longitudinal ribs forming channels;
said valve casing further including
a metallic head part connected to said movable wall, and
said guiding hub made of plastic rigidly connected to said head part remote from said movable wall.

3. A brake booster according to claim 2, wherein said guiding hub includes two coaxial sleeves nested in each other and forming said common channel section therebetween.

4. A brake booster according to claim 3, wherein the outer surface of the inner one of said two sleeves has second longitudinal ribs formed therein to provide channels for said common channel section.

5. A brake booster according to claim 4, wherein said inner sleeve has a construction similar to a multi-spline shaft.

6. A brake booster according to claim 3, wherein the inner surface of the outer one of said two sleeves has second longitudinal ribs formed therein to provide channels for said common channel section.

7. A brake booster according to claims 2, 3 or 4, wherein
said head part includes a first shoulder and said guiding hub is seated on the outer surface of said first shoulder.

8. A brake booster according to claim 7, wherein the outer surface of said first shoulder includes an annular groove therein, and
said guiding hub includes an inwardly extending projection engaging said groove.

9. A brake booster according to claim 8, wherein said head part includes a second shoulder disposed between said first shoulder and said movable wall having a vacuum channel passed therethrough, and through said guiding hub having one end thereof abutting said second shoulder.

10. A brake booster according to claim 9, wherein said rolling diaphragm seal seals said guiding hub against outside contaminents.

11. A brake booster according to claim 10, wherein the inner edge of said rolling diaphragm seal is sealingly fastened to the inner surface of the end of said guiding hub remote from said head part and the outer edge of said rolling diaphragm seal is sealingly fastened to an end of said portion of one transverse end wall remote from said movable wall.

12. A brake booster according to claim 8, wherein said rolling diaphragm seal seals said guiding hub against outside contaminents.

13. A brake booster according to claim 12, wherein the inner edge of said rolling diaphragm seal is sealingly fastened to the inner surface of the end of said guiding hub remote from said head part and the outer edge of said rolling diaphragm seal is sealingly fastened to an end of said portion of one transverse end wall remote from said movable wall.

14. A brake booster according to claim 7, wherein said rolling diaphragm seal seals said guiding hub against outside contaminents.

15. A brake booster according to claim 14, wherein the inner edge of said rolling diaphragm seal is sealingly fastened to the inner surface of the end of said guiding hub remote from said head part and the outer edge of said rolling diaphragm seal is sealingly fastened to an end of said portion of one transverse end wall remote from said movable wall.

16. A brake booster comprising:
a booster casing having a movable wall disposed therein coaxial of a longitudinal axis of said booster casing to divide said booster casing into a vacuum chamber and a working chamber; and
a control valve to control pressure in said working chamber, said control valve having a control valve casing rigidly connected to said movable wall, said valve casing having a guiding hub disposed coaxial of said axis to axially guide said valve casing in an axially outwardly extending portion of one transverse end wall of said booster casing defining said working chamber, said guiding hub having a common channel section extending from an end thereof remote from said movable wall toward said movable wall, said control valve having a chamber communicating with said common channel section disposed between an inner surface of said portion of one transverse end wall, an outer surface of said valve casing and a rolling diaphragm seal disposed between said portion of one transverse end wall and said valve casing, said rolling diaphragm having first longitudinal ribs forming channels;
said guiding hub including two coaxial sleeves nested in each other and forming said common channel section therebetween.

17. A brake booster according to claim 16, wherein the outer surface of the inner one of said two sleeves has second longitudinal ribs formed therein to provide channels for said common channel section.

18. A brake booster according to claim 17, wherein said inner sleeve has a construction similar to a multi-spline shaft.

19. A brake booster according to claim 16, wherein the inner surface of the outer one of said two sleeves has second longitudinal ribs formed therein to provide channels for said common channel section.

* * * * *